United States Patent
Noji et al.

(10) Patent No.: US 11,358,829 B2
(45) Date of Patent: Jun. 14, 2022

(54) FILAMENT WINDING APPARATUS

(71) Applicant: HONDA MOTOR CO., LTD., Tokyo (JP)

(72) Inventors: Yohei Noji, Wako (JP); Kosuke Tatsushima, Wako (JP); Hiroyuki Takahashi, Wako (JP); Kenta Umetsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 16/811,441

(22) Filed: Mar. 6, 2020

(65) Prior Publication Data

US 2020/0283256 A1    Sep. 10, 2020

(30) Foreign Application Priority Data

Mar. 8, 2019    (JP) .............................. JP2019-042196

(51) Int. Cl.

| | |
|---|---|
| *B65H 51/015* | (2006.01) |
| *B65H 57/14* | (2006.01) |
| *D02J 1/18* | (2006.01) |
| *B65H 57/04* | (2006.01) |
| *B29C 53/58* | (2006.01) |
| *B65H 54/44* | (2006.01) |
| *B29C 70/32* | (2006.01) |

(52) U.S. Cl.
CPC .............. *B65H 54/44* (2013.01); *B29C 70/32* (2013.01); *B65H 51/015* (2013.01); *B65H 57/04* (2013.01); *B65H 57/14* (2013.01); *D02J 1/18* (2013.01); *B29C 53/581* (2013.01); *B65H 2404/111* (2013.01); *B65H 2511/172* (2013.01)

(58) Field of Classification Search
CPC ...... B65H 51/015; B65H 57/04; B29C 53/581
See application file for complete search history.

(56) References Cited

U.S. PATENT DOCUMENTS 6,094,791 A * 8/2000 Akase ....................... D02J 1/18
28/282
2018/0044827 A1 * 2/2018 de Weerd ................ B29C 70/20

FOREIGN PATENT DOCUMENTS

| JP | 2007-276193 A | 10/2007 |
|---|---|---|
| JP | 2015-166408 A | 9/2015 |

OTHER PUBLICATIONS

Office Action dated Dec. 22, 2020 issued over the corresponding Japanese Patent Application No. 2019-042196 with the English translation thereof.

* cited by examiner

*Primary Examiner* — William E Dondero
(74) *Attorney, Agent, or Firm* — Carrier Blackman & Associates, P.C.; Joseph P. Carrier; William D. Blackman

(57) ABSTRACT

A filament winding apparatus winds, around a workpiece, a fiber bundle formed by bundling a plurality of fibers. The filament winding apparatus includes a widening roller that rotates while making contact with the fiber bundle that is being conveyed. The widening roller has, provided on the peripheral surface, a plurality of projecting ridges extending in the axial direction, the projecting ridges being arranged side by side in the circumferential direction. The projecting ridges make contact with the fiber bundle to thereby widen the fiber bundle.

7 Claims, 4 Drawing Sheets

FILAMENT WINDING APPARATUS

CROSS-REFERENCE TO RELATED APPLICATION

This application is based upon and claims the benefit of priority from Japanese Patent Application No. 2019-042196 filed on Mar. 8, 2019, the contents of which are incorporated herein by reference.

BACKGROUND OF THE INVENTION

Field of the Invention

The present invention relates to a filament winding apparatus that winds, around a workpiece, a fiber bundle formed by bundling a plurality of fibers.

Description of the Related Art

As disclosed in, for example, Japanese Laid-Open Patent Publication No. 2007-276193, there is a conventionally known filament winding apparatus that winds, around a workpiece, a fiber bundle impregnated with resin. This apparatus widens a fiber bundle (i.e., increases the width thereof) to obtain a band shape and then winds the fiber bundle around a workpiece. Specifically, a widening roller is provided at a position closer to a workpiece on the conveying path for fiber bundles from a plurality of bobbins around which the fiber bundles are wound, to the workpiece, and the fiber bundles are widened by conveying the fiber bundles while pressing the fiber bundles against the peripheral surface of the widening roller. Convex curved surfaces and concave curved surfaces are alternately provided along the axial direction of the widening roller on the peripheral surface of the widening roller, and the surface pressure applied to the fiber bundles by the convex curved surfaces widens the fiber bundles.

SUMMARY OF THE INVENTION

In the widening roller on which convex curved surfaces and concave curved surfaces are alternately provided along the axial direction on the peripheral surface as described above, the surface pressure applied is likely to vary, in the width direction, between portions of the fiber bundles that are in contact with convex curved surfaces and portions thereof that face concave curved surfaces. That is, it is difficult to apply the surface pressure evenly to the entirety of the fiber bundles in the width direction, and thus there is a concern that the fiber bundles cannot be widened efficiently.

In addition, even when the fiber bundles that are being conveyed are pressed and widened by the convex curved surfaces, if the fiber bundles are separated from the convex curved surfaces and are released from a surface-pressure applied state, the fiber bundles may contract in the width direction. Even when a plurality of widening rollers described above are arranged in the conveyance direction in order to suppress the above contraction, the range in which the interval (pitch) between the widening rollers can be reduced is limited. Accordingly, there is a concern that the fiber bundles contract before the fiber bundles are conveyed from one widening roller to the adjacent widening roller, so that the fiber bundles cannot be widened efficiently.

The present invention has been made in consideration of the above problems, and has an object of providing a filament winding apparatus capable of efficiently widening a fiber bundle.

According to an embodiment of the present invention, there is provided a filament winding apparatus that winds, around a workpiece, a fiber bundle formed by bundling a plurality of fibers. The filament winding apparatus includes: a widening roller configured to rotate while making contact with the fiber bundle that is being conveyed; and the widening roller includes, provided on a peripheral surface thereof, a plurality of projecting ridges extending in an axial direction of the widening roller, the projecting ridges being arranged side by side in a circumferential direction of the widening roller, and the projecting ridges make contact with the fiber bundle to thereby widen the fiber bundle.

In the present invention, the plurality of projecting ridges extending in the axial direction are arranged side by side in the circumferential direction on the peripheral surface of the widening roller. By bringing the projecting ridges extending in the axial direction as described above into contact with the fiber bundle, the surface pressure can be applied substantially evenly to the entirety of the fiber bundle in the width direction, thereby enabling the fiber bundle to be widened efficiently.

In addition, since the plurality of projecting ridges are provided side by side in the circumferential direction on the peripheral surface of the widening roller, a surface pressure can be applied to the fiber bundle by bringing the projecting ridges into contact with the fiber bundle at an interval smaller than in the case in which, for example, a roller (not illustrated) without projecting ridges is additionally provided in the conveying path. That is, even when the fiber bundle widened by making contact with the preceding projecting ridge is separated from the preceding projecting ridge, a surface pressure can be continuously applied to the widened fiber bundle by bringing the following projecting ridge adjacent to the preceding projecting ridge into contact with the fiber bundle before the fiber bundle contracts in the width direction. Since a surface pressure can be applied continuously at the smaller intervals via the plurality of projecting ridges as described above, the fiber bundle can be efficiently widened by effectively suppressing contraction of the fiber bundle in the width direction.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
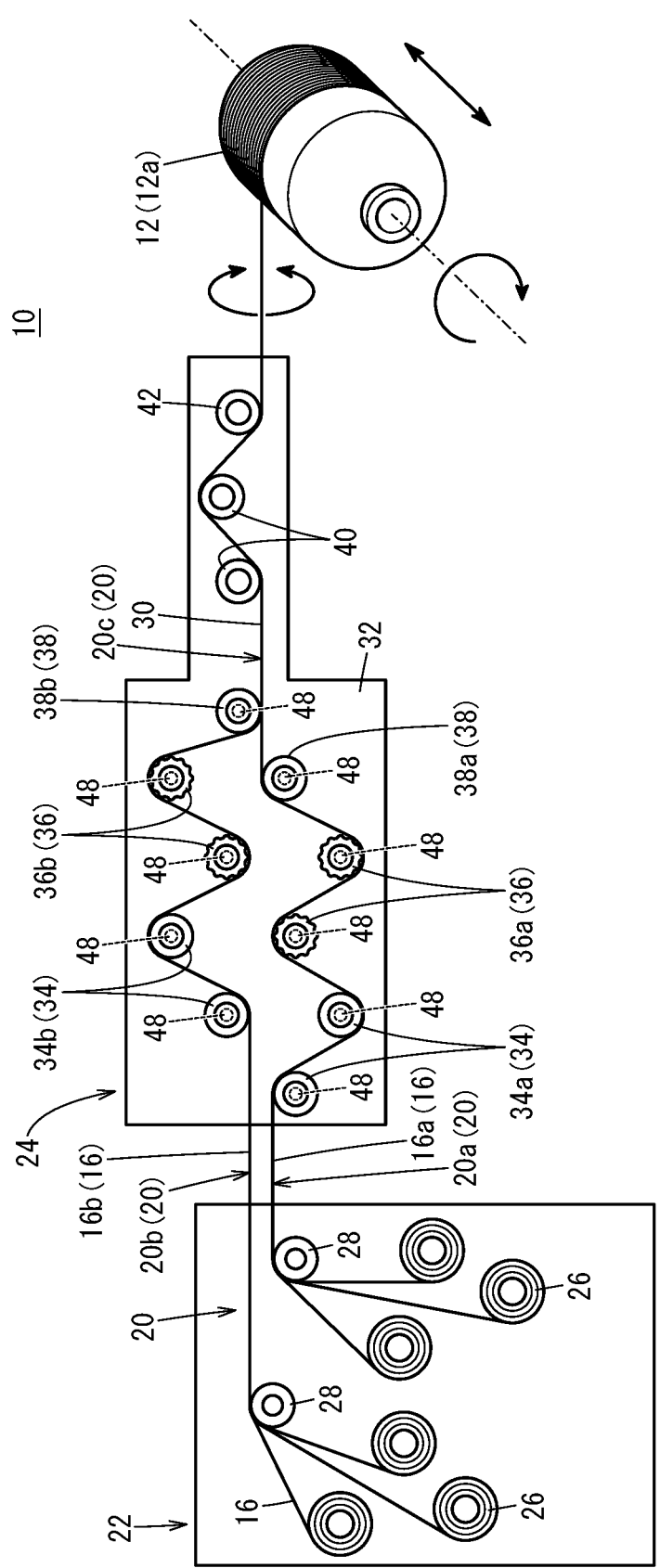
FIG. 1 is an overall view schematically illustrating a filament winding apparatus according to an embodiment of the present invention and a liner.

A preferable embodiment of a filament winding apparatus according to the present invention will be described in details with reference to the attached drawings. In the attached drawings, repeated descriptions may be omitted by denoting components with identical or similar functions and effects as identical reference characters.

As illustrated in FIG. 1, in an example described below, a filament winding apparatus 10 according to the embodiment is used to form a fiber-reinforced resin layer (not illustrated). The fiber-reinforced resin layer is formed by winding fiber bundles 16 formed by bundling a plurality of fibers 14 (see FIGS. 4A and 4B) around the outer surface of a resinous liner 12 that constitutes a high-pressure tank (not illustrated). In this example, the liner 12 is a workpiece 12a. However, the invention is not specially limited to this example, and the filament winding apparatus 10 may also be used to wind the fiber bundles 16 around the workpiece 12a other than the resinous liner 12.

Figure 4A:
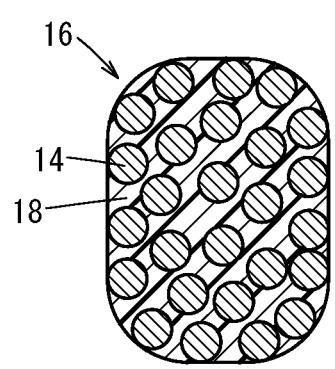
FIG. 4A is a cross-sectional view of the fiber bundle taken along line IVA-IVA in FIG. 3B
Figure 4B:
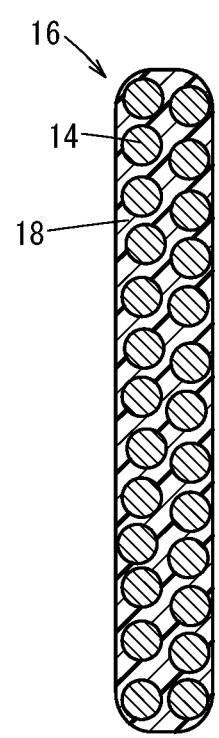
FIG. 4B is a cross-sectional view of the fiber bundle taken along line IVB-IVB in FIG. 3B.

In addition, in the embodiment, the fiber bundles 16 are assumed to be tow prepregs preliminarily impregnated with thermosetting resin 18 (see FIGS. 4A and 4B). However, the fiber bundles 16 do not necessarily need to include the resin 18 and, in this case, the fiber bundles 16 may be impregnated with the resin 18 halfway through conveying paths 20 of the fiber bundles 16. Examples of the fibers 14 that constitute the fiber bundles 16 may be carbon fibers, glass fibers, aramid fibers, and the like. Examples of the resin 18 with which the fiber bundles 16 are impregnated may be epoxy resin, phenol resin, unsaturated polyester resin, and the like.

The filament winding apparatus 10 includes a quill stand 22, a delivery head 24, and a liner supporting unit (not illustrated). The quill stand 22 includes a plurality of bobbins 26, a bobbin driving unit (not illustrated), and a plurality of guide rollers 28. The fiber bundles 16 are wound around the bobbins 26 in advance. The bobbin driving unit rotationally drives the bobbins 26, whereby the fiber bundles 16 are reeled out from the bobbins 26. The guide rollers 28 are rotatably provided, and configured to guide the fiber bundles 16 reeled out from the bobbins 26 to the delivery head 24 by conveying the fiber bundles 16 while collecting the bundles and changing the running direction of the bundles. In the embodiment, in addition to the fiber bundles wound around the bobbins 26, the fiber bundles collected after being reeled out from the bobbins 26 are also referred to as the fiber bundles 16, as long as they are formed by bundling a plurality of fibers.

Although only two guide rollers 28 are illustrated in FIG. 1, the number and the installation positions of guide rollers 28 may be variously set according to a path through which the fiber bundles 16 are conveyed or the like. In addition, a tension adjusting mechanism (not illustrated) or the like for adjusting the tensions of the fiber bundles 16 that are being conveyed may be provided between the quill stand 22 and the delivery head 24.

In the embodiment, before the plurality of conveying paths 20, which convey the plurality of fiber bundles 16 reeled out from the plurality of bobbins 26, reaches the delivery head 24, the conveying paths 20 are organized and structured into two paths, i.e., a first conveying path 20a and a second conveying path 20b. That is, the fiber bundles 16 are supplied to the delivery head 24 via the first conveying path 20a and the second conveying path 20b.

In the following description, the fiber bundles 16 that are conveyed through the first conveying path 20a are also referred to as first fiber bundles 16a. In addition, the fiber bundles 16 that are conveyed through the second conveying path 20b are also referred to as second fiber bundles 16b. Further, the first fiber bundle 16a and the second fiber bundle 16b are also collectively referred to simply as the fiber bundles 16.

Figure 2:
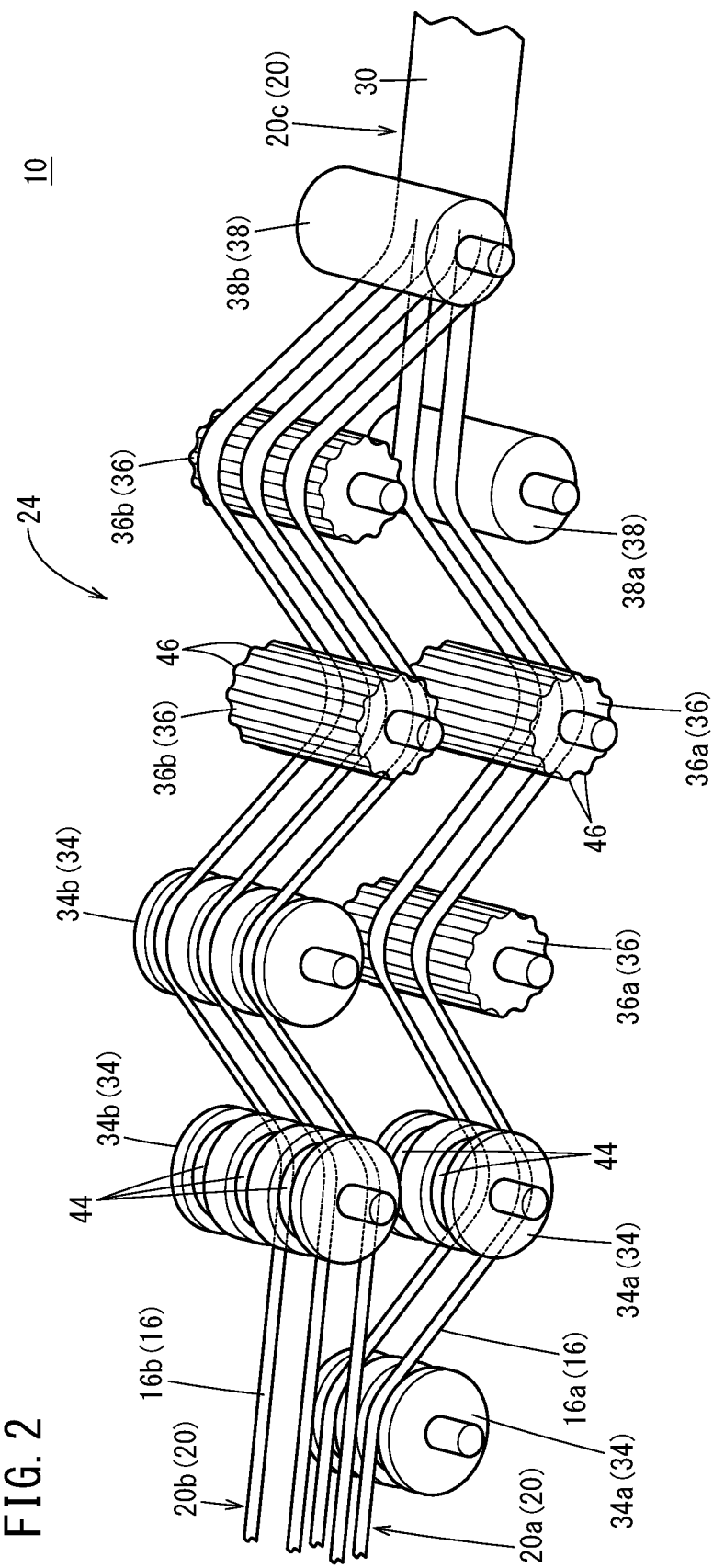
FIG. 2 is a perspective view schematically illustrating a delivery head excluding a main unit.

As illustrated in FIG. 2, the first conveying path 20a conveys the two first fiber bundles 16a spaced from each other in parallel. The second conveying path 20b conveys the three second fiber bundles 16b spaced from each other in parallel. The number of first fiber bundles 16a and the number of second fiber bundles 16b respectively conveyed through the first conveying path 20a and the second conveying path 20b are not specially limited and may be one, or the number other than the numbers described above.

The delivery head 24 collects or gathers the first fiber bundles 16a and the second fiber bundles 16b supplied as described above into one band-shaped fiber bundle 16 (also referred to below as a band-shaped bundle 30) and then supplies the band-shaped fiber bundle 16 to the liner 12 (FIG. 1) supported by the liner supporting unit. As illustrated in FIG. 1, the delivery head 24 has a main unit 32 capable of, for example, reciprocally moving relative to the liner 12 in the axial direction of the liner 12 or rotating positively and reversely about the extension direction of a merging path 20c described later. In FIG. 2, the main unit 32 is not illustrated. The main unit 32 includes aligning rollers 34, widening rollers 36, collecting rollers 38, width adjusting rollers 40, and a front end roller 42, which are rotatable and axes of which are parallel to each other.

In the embodiment, the aligning rollers 34 include a total of four aligning rollers including two first aligning rollers 34a disposed in the first conveying path 20a and two second aligning rollers 34b disposed in the second conveying path 20b (these aligning rollers are also collectively referred to simply as the aligning rollers 34). The widening rollers 36 include a total of four widening rollers including two first widening rollers 36a disposed in the first conveying path 20a and two second widening rollers 36b disposed in the second conveying path 20b (these widening rollers are also collectively referred to simply as the widening rollers 36).

The collecting rollers 38 include a total of two collecting rollers including a first collecting roller 38a disposed in the first conveying path 20a and a second collecting roller 38b disposed in the second conveying path 20b (these collecting rollers are also collectively referred to simply as the collecting rollers 38). In the following description, when, for example, the aligning rollers 34, the widening rollers 36, and the collecting rollers 38 are not distinguished from each other, these rollers are also collectively referred to as the rollers.

In the first conveying path 20a, the two first aligning rollers 34a, the two first widening rollers 36a, and one first collecting roller 38a are provided in this order from upstream to downstream. The first aligning rollers 34a, the first widening rollers 36a, and the first collecting roller 38a are arranged in a staggered manner in the conveyance direction of the fiber bundles 16 as viewed from the axial direction of the rollers. The conveying path angle θ formed by the entry direction and the discharge direction of the first fiber bundle 16a in each of the rollers is an acute angle.

In addition, in the second conveying path 20b, the two second aligning rollers 34b, the two second widening rollers 36b, and one second collecting roller 38b are provided in this order from upstream to downstream. The second aligning rollers 34b, the second widening rollers 36b, and the second collecting roller 38b are arranged in a staggered manner in the conveyance direction of the fiber bundles 16 as viewed from the axial direction of the rollers. The conveying path angle θ formed by the entry direction and the discharge direction of the second fiber bundle 16b in each of the rollers is an acute angle.

As illustrated in FIGS. 1 and 2, the first conveying path 20a and the second conveying path 20b are merged when these paths reach the second collecting roller 38b. Accordingly, a merging path 20c for conveying the band-shaped bundle 30 is formed downstream of the second collecting roller 38b. As illustrated in FIG. 1, in the merging path 20c, the two width adjusting rollers 40 and one front end roller 42 are disposed in this order from upstream to downstream. The band-shaped bundle 30 is supplied to the outer surface of the liner 12 via the merging path 20c.

The aligning roller 34 rotates while making contact with the fiber bundle 16 that has passed through the guide roller 28. As illustrated in FIG. 2, the aligning roller 34 has, provided on a peripheral surface thereof, a plurality of circumferential direction grooves 44 extending in the circumferential direction and which are arranged side by side in the axial direction. As described above, the two circumferential direction grooves 44 are provided in each of the first aligning rollers 34a provided in the first conveying path 20a through which the two first fiber bundles 16a are conveyed, and one first fiber bundle 16a passes through each of the circumferential direction grooves 44. In addition, the three circumferential direction grooves 44 are provided in each of the second aligning rollers 34b provided in the second conveying path 20b through which the three second fiber bundles 16b are conveyed, and one second fiber bundle 16b passes through each of the circumferential direction grooves 44. In this way, the fiber bundles 16 pass through the respective circumferential direction grooves 44 as described above, and thus the positions of the plurality of fiber bundles 16 with respect to the conveying path 20 can be adjusted.

Figure 3A:
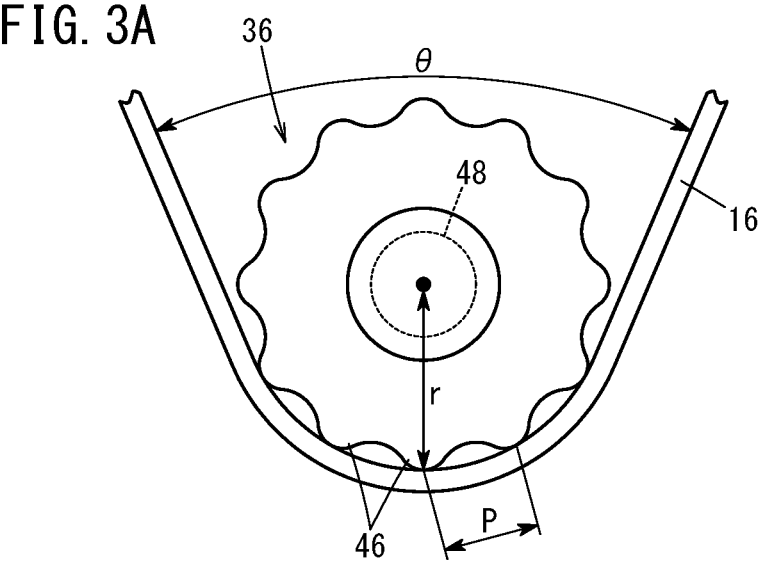
FIG. 3A is an explanatory diagram illustrating how projecting ridges make contact with a fiber bundle as viewed from an axial direction of a widening roller and FIG. 3B is an explanatory diagram illustrating how the projecting ridges make contact with the fiber bundle as viewed from an radial direction of the widening roller.
Figure 3B:
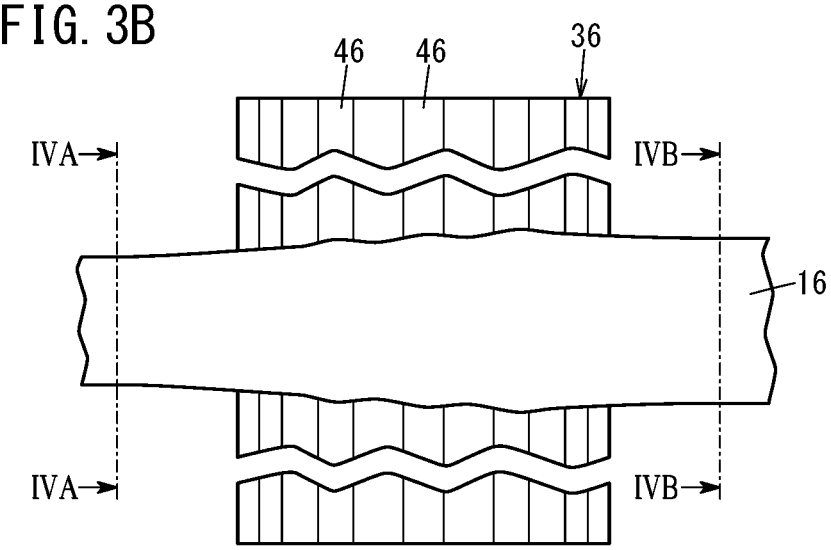

The widening roller 36 rotates while making contact with the fiber bundle 16 that has passed through the aligning roller 34. As illustrated in FIGS. 2, 3A, and 3B, the widening roller 36 has, provided on a peripheral surface thereof, a plurality of projecting ridges 46 extending in the axial direction and which are arranged side by side in the circumferential direction. Since the plurality of projecting ridges 46 continuously makes contact with the fiber bundle 16 as the widening roller 36 rotates, a surface pressure is continuously applied to the fiber bundle 16 via the projecting ridges 46. As a result, the width of the fiber bundle 16 that has passed through the widening roller 36 as illustrated in FIGS. 3B and 4B is larger (widened) than the width of the fiber bundle 16 before passing through the widening roller 36 as illustrated in FIGS. 3B and 4A.

That is, as illustrated in FIGS. 4A and 4B, the plurality of fibers 14 are stacked in the thickness direction of the fiber bundle 16 via the resin 18 in the fiber bundle 16. Since a surface pressure is applied via the projecting ridges 46 when the fiber bundle 16 passes through the widening roller 36, the plurality of fibers 14 stacked are spread out in the width direction. This reduces the thickness of the fiber bundle 16 and enlarges the width of the fiber bundle 16.

As illustrated in FIG. 3A, the plurality of projecting ridges 46 are arranged side by side at equal intervals in the circumferential direction of the widening roller 36. For example, an interval P between the projecting ridges 46 is set to be smaller than a length r in the radial direction from the axis center of the widening roller 36 to the tip of each of the projecting ridges 46. In addition, in the widening roller 36, the center angle of a circular arc between the adjacent projecting ridges 46 is preferably 90° or less, more preferably 45° or less, and further more preferably 30° or less.

As illustrated in FIGS. 1 and 2, the collecting roller 38 rotates while making contact with the fiber bundle 16 that has passed through the widening roller 36. The surface of the fiber bundle 16 that has made contact with the peripheral surface of the collecting roller 38 is smoothed. That is, variation in the thickness in the longitudinal direction of the fiber bundle 16 is reduced, for example.

In addition, as illustrated in FIG. 2, the first fiber bundles 16a that have passed through the first collecting roller 38a are passed through the second collecting roller 38b together with the second fiber bundles 16b, and then each of the second fiber bundles 16b is disposed in a space between the first fiber bundles 16a and each of the first fiber bundles 16a is disposed in a space between the second fiber bundles 16b. As a result, the band-shaped bundle 30 is formed. At this time, the first fiber bundle 16a and the second fiber bundle 16b adjacent to each other may be arranged so that end portions thereof in the width direction overlap each other. The band-shaped bundle 30 can be formed by adjusting the positions of the fiber bundles 16 on the conveying paths 20 using the aligning rollers 34 and thereby merging the first fiber bundles 16a and the second fiber bundles 16b at predetermined positions using the collecting rollers 38.

At least the peripheral surfaces of the rollers that make contact with the fiber bundles 16 are made of fluorine resin or silicone resin. The rollers may be made of metal and, in this case, the peripheral surfaces thereof are coated with fluorine resin or silicone resin.

In addition, since the rollers have respective heating units 48 (see FIG. 1) such as, for example, heaters, the temperatures of the peripheral surfaces thereof can be increased. The heating unit 48 preferably causes the peripheral surfaces of the rollers to have temperatures at which the viscosity of the resin 18 included in the fiber bundles 16 in contact with the peripheral surfaces can be reduced.

The width adjusting roller 40 adjusts the width of the band-shaped bundle 30 by rotating while making contact with the band-shaped bundle 30 that has passed through the second collecting roller 38b. The filament winding apparatus 10 does not necessarily need to have the width adjusting roller 40. The front end roller 42 pays out or feeds out the band-shaped bundle 30 whose width has been adjusted by the width adjusting roller 40, toward the liner 12 supported by the liner supporting unit.

The liner supporting unit has a supporting mechanism (not illustrated) that rotatably supports the liner 12 about the longitudinal direction thereof and a rotationally driving mechanism (not illustrated) that rotates the liner 12. The filament winding apparatus 10 can wind the band-shaped bundle 30 around the outer surface of the liner 12 by paying out the band-shaped bundle 30 via the front end roller 42 while moving the main unit 32 of the delivery head 24 relative to the liner 12 rotationally driven by the liner supporting unit.

The filament winding apparatus 10 according to the embodiment is basically configured as described above. When the fiber bundles 16 are wound around the liner 12 by using the filament winding apparatus 10, the fiber bundles 16 reeled out from the bobbins 26 of the quill stand 22 are supplied to the delivery head 24 via the first conveying path 20a and the second conveying path 20b. When the first fiber bundles 16a are conveyed in two rows through the first conveying path 20a, the positions thereof on the first conveying path 20a are adjusted by the first aligning rollers 34a. Thereafter, the fiber bundles 16a are widened (i.e., the width thereof is increased) by the first widening rollers 36a, and the surfaces are smoothed by the first collecting roller 38a. Then, the first fiber bundles 16a are fed to the second collecting roller 38b of the second conveying path 20b.

When the second fiber bundles 16b are conveyed in three rows through the second conveying path 20b, the positions thereof on the second conveying path 20b are adjusted by the second aligning rollers 34b. Thereafter, the widths are widened by the second widening rollers 36b, the surfaces are smoothed by the second collecting roller 38b, and the second fiber bundles 16b are integrated with the first fiber bundles 16a to thereby form the band-shaped bundle 30 in one row. The band-shaped bundle 30 is conveyed through the merging path 20c, and the width thereof is adjusted by the width adjusting rollers 40. Then, the band-shaped bundle 30 is supplied to the liner 12 via the front end roller 42.

At this time, the liner supporting unit rotates the liner 12, whereby the band-shaped bundle 30 is wound around the outer surface of the liner 12. In addition, the band-shaped bundle 30 is wound in a predetermined way so as to cover the entire outer surface of the liner 12 by rotating the main unit 32 of the delivery head 24 as described above to thereby adjust the supply angle of the band-shaped bundle 30 relative to the outer surface of the liner 12 or reciprocally moving the main unit 32 as described above to thereby adjust the supply position of the band-shaped bundle 30 in the axial direction of the liner 12. A fiber-reinforced resin layer that covers the outer surface of the liner 12 can be formed by hardening the resin 18 of the band-shaped bundle 30 that has been thus wound.

As described above, in the filament winding apparatus 10 according to the embodiment, the plurality of projecting ridges 46 extending in the axial direction are arranged in the circumferential direction on the peripheral surface of the widening roller 36. By bringing the projecting ridges 46 extending in the axial direction as described above into contact with the fiber bundles 16, a surface pressure can be applied substantially evenly to the entirety of the fiber bundle 16 in the width direction, thereby enabling the fiber bundle 16 to be widened efficiently.

In addition, in this widening roller 36, the area of the tip of the projecting ridge 46 corresponds to the contact area with the fiber bundle 16. The contact area between the tip of the projecting ridge 46 and the fiber bundle 16 is smaller than the contact area between, for example, the peripheral surface (not illustrated) of a roller that has the same diameter without the projecting ridges 46 and the fiber bundle 16. Since the projecting ridge 46 with a smaller contact area can apply a larger surface pressure to the fiber bundle 16, the fiber bundle 16 can be efficiently widened.

It may be also conceivable to increase the surface pressure by, for example, reducing the contact area with the fiber bundle 16 by reducing the diameter of the roller itself. However, when the diameter of the roller is reduced, there is a concern that the fiber bundle 16 is easily entangled with the roller. In the widening roller 36 of the filament winding apparatus 10, the surface pressure can be increased by providing the projecting ridges 46 as described above without reducing the diameter of the widening roller 36. Accordingly, there is no concern that the fiber bundle 16 is easily entangled with the roller.

In addition, since the plurality of projecting ridges 46 are arranged in the circumferential direction on the peripheral surface of the widening roller 36, a surface pressure can be applied to the fiber bundle 16 by bringing the projecting ridges 46 into contact with the fiber bundle 16 at the intervals P smaller than in the case in which, for example, a roller (not illustrated) without the projecting ridges 46 is additionally provided in the conveying path 20 to apply the surface pressure. That is, even when the fiber bundle 16 widened by making contact with the preceding projecting ridge 46 is separated from the preceding projecting ridge 46, the following projecting ridge 46 adjacent to the preceding projecting ridge 46 is brought into contact with the fiber bundle 16 before the fiber bundle 16 contracts in the width direction, whereby a surface pressure can be continuously applied. Since a surface pressure can be applied continuously at the smaller intervals P via the plurality of projecting ridges 46 as described above, the fiber bundle 16 can be efficiently widened by effectively suppressing the contraction of the fiber bundle 16 in the width direction.

In the filament winding apparatus 10 according to the embodiment, the plurality of projecting ridges 46 are arranged at equal intervals in the circumferential direction of the widening roller 36, and the interval P between the projecting ridges 46 is smaller than the length r in the radial direction from axis center of the widening roller 36 to the tip of each of the projecting ridges 46. In this case, the interval P at which the projecting ridge 46 makes contact with the fiber bundle 16 that is being conveyed can be reduced sufficiently and the surface pressure applied to the bundle via the projecting ridge 46 can be increased sufficiently. This can further improve the efficiency of widening of the fiber bundle 16. The plurality of projecting ridges 46 may be arranged at different intervals in the circumferential direction of the widening roller 36. In addition, the interval P between the projecting ridges 46 is not particularly limited as long as the fiber bundle 16 can be widened by continuously applying the surface pressure to the fiber bundle 16 that is being conveyed.

In the filament winding apparatus 10 according to the embodiment, the peripheral surface of the widening roller 36 is made of fluorine resin or silicone resin, or is coated with fluorine resin or silicone resin. In this case, the fiber bundle 16 is prevented from sticking to the peripheral surface of the widening roller 36, and thus the fiber bundle 16 can be widened more successfully. In addition, in the embodiment, the peripheral surfaces of the aligning roller 34 and the collecting roller 38 are also made of fluorine resin or silicone resin or are coated with fluorine resin or silicone resin similarly. This makes it possible to convey the fiber bundle 16 smoothly, and thus the band-shaped bundle 30 of high quality can be formed.

In the filament winding apparatus 10 according to the embodiment, the plurality of (two for each of the first conveying path 20a and the second conveying path 20b) widening rollers 36 are arranged in the conveyance direction of the fiber bundle 16. This makes it possible to widen the fiber bundle 16 more effectively. However, the number of the widening rollers 36 provided in the conveying path 20 is not particularly limited and the number may be one, or three or more.

The filament winding apparatus 10 according to the embodiment further includes the aligning roller 34 configured to rotate while making contact with the fiber bundle 16 before passing through the widening roller 36, and the collecting roller 38 configured to form the fiber bundle 16 into the band-shaped bundle 30 by rotating while making contact with the fiber bundle 16 that has passed through the widening roller 36. The aligning roller 34 includes, provided on a peripheral surface thereof, the plurality of circumferential direction grooves 44 extending in the circumferential direction, the circumferential direction grooves being arranged side by side in the axial direction, and the position of the fiber bundle 16 on the conveying path 20 is adjusted in the circumferential direction grooves 44.

When, for example, the fiber bundle 16 is conveyed while changing its own running direction by the guide rollers 28 or the main unit 32 of the delivery head 24 is rotated, the fiber bundle 16 before reaching the aligning roller 34 may be twisted. As a result, the fiber bundle 16 easily contracts in the width direction or the position of the fiber bundle 16 relative to the conveying path 20 easily varies. Even in such a case, the fiber bundle 16 can be successfully widened by supplying the fiber bundle 16 to the widening roller 36 via the aligning roller 34.

In addition, the fiber bundles 16 are gathered together via the collecting roller 38 to form the band-shaped bundle 30, and the band-shaped bundle 30 is supplied to the liner 12, whereby the fiber bundle 16 can be efficiently wound around the liner 12 while suppressing the slip of the fiber bundle 16 and the like.

In the filament winding apparatus 10 according to the embodiment, the surface of the fiber bundle 16 is smoothed by bringing the peripheral surface of the collecting roller 38 into contact with the surface of the fiber bundle 16. Even when variation in the thickness occurs between a portion of the fiber bundle that has made contact with the projecting ridge 46 and another portion thereof in the longitudinal direction of the fiber bundle 16 that has passed through the widening roller 36, the variation is reduced by passing the fiber bundle 16 through the collecting roller 38, and the surface of the fiber bundle 16 can thereby be smoothed. This can further improve the efficiency of widening of the fiber bundle 16 and the quality of a fiber-reinforced resin layer obtained by winding the fiber bundle 16 around the liner 12.

In the filament winding apparatus 10 according to the embodiment, at least the widening roller 36 and the collecting roller 38 among the aligning roller 34, the widening roller 36, and the collecting roller 38 each have a heating unit 48 configured to raise a temperature of the peripheral surface thereof. Since the viscosity of the resin 18 included in the fiber bundle 16 can be reduced in this case, the fiber bundle 16 can be widened more effectively and the smoothing of the surface of the fiber bundle 16 and the formation of the band-shaped bundle 30 can be facilitated, for example.

In the filament winding apparatus 10 according to the embodiment, the aligning roller 34, the widening roller 36, and the collecting roller 38 are arranged in a staggered manner in the conveyance direction of the fiber bundle 16, as viewed from the axial direction. In this case, the conveying path angle θ formed between the entry direction and the discharge direction of the fiber bundle 16 in each of the rollers can be set to be an acute angle easily. Accordingly, in the widening roller 36, the fiber bundle 16 can be widened more efficiently by increasing the surface pressure applied to the fiber bundle 16 from the projecting ridge 46.

In the filament winding apparatus 10 according to the embodiment, the fiber bundle 16 includes a plurality of first fiber bundles 16a and a plurality of second fiber bundles 16b, and the conveying path 20 for the fiber bundle 16 includes the first conveying path 20a configured to convey the plurality of first fiber bundles 16a spaced from each other in parallel, the second conveying path 20b configured to convey the plurality of second fiber bundles 16b spaced from each other in parallel, and the merging path 20c configured to convey the first fiber bundles 16a and the second fiber bundles 16b merged with each other. The aligning roller 34 includes the first aligning roller 34a provided in the first conveying path 20a and the second aligning roller 34b provided in the second conveying path 20b. The widening roller 36 includes the first widening roller 36a provided in the first conveying path 20a and the second widening roller 36b provided in the second conveying path 20b. The collecting roller 38 includes the first collecting roller 38a and the second collecting roller 38b configured to merge the first conveying path 20a with the second conveying path 20b, and, by passing the first fiber bundles 16a that have passed through the first collecting roller 38a through the second collecting roller 38b together with the second fiber bundles 16b, each of the second fiber bundles 16b is disposed in a space between the first fiber bundles 16a and each of the first fiber bundles 16a is disposed in a space between the second fiber bundles 16b, whereby the band-shaped bundle 30 is formed.

When the fiber bundles 16 not sufficiently widened are arranged side by side in the width direction in parallel to each other to thereby form the band-shaped bundle 30, spaces are easily generated between the fiber bundles 16 arranged side by side, that is, in the band-shaped bundle 30. When the band-shaped bundle 30 containing spaces as described above is wound around the liner 12, voids are easily generated in the obtained fiber-reinforced resin layer.

To suppress the generation of spaces in the band-shaped bundle 30, it may be conceivable to dispose the fiber bundles 16 closer to the middle in the arrangement direction of the fiber bundles 16 to thereby form the band-shaped bundle 30. In this case, however, the width of the obtained band-shaped bundle 30 becomes small. As a result, spaces easily occur between the band-shaped bundles 30 adjacent to each other when the band-shaped bundle 30 is wound around the liner 12. Consequently, it is difficult to suppress the generation of voids in the fiber-reinforced resin layer.

As described above, the filament winding apparatus 10 can suitably widen the fiber bundle 16 via the widening roller 36 having the projecting ridges 46. In addition, since the plurality of first fiber bundles 16a are spaced from each other in parallel on the first conveying path 20a, the first fiber bundles 16a in contact with the projecting ridges 46 of the first widening rollers 36a can be widened suitably toward the spaces on both sides in the width direction. This can also widen the plurality of first fiber bundles 16a effectively. The second fiber bundles 16b on the second conveying path 20b can also be effectively widened similarly.

Accordingly, the filament winding apparatus 10 can form the band-shaped bundle 30 by arranging side by side, in parallel, the fiber bundles 16 that have been widened suitably. Therefore, the generation of spaces between the adjacent fiber bundles 16 can be suppressed without reducing the width of the band-shaped bundle 30. That is, a fiber-reinforced resin layer for which the generation of voids is suppressed can be obtained, and it is thus possible to suppress generation of cracks originating from the voids. As a result, it is possible to suitably improve the durability of a high-pressure tank, particularly, the cycle performance concerning the supply and discharge of a fluid.

The conveying path 20 for the fiber bundles 16 may have only one of the first conveying path 20a and the second conveying path 20b. In addition, the conveying path 20 may have a plurality of first conveying paths 20a and a plurality of second conveying paths 20b instead of one first conveying path 20a and one second conveying path 20b. In addition, the first conveying path 20a may convey the first fiber bundles 16a disposed in parallel with no space therebetween or may convey the first fiber bundles 16a arranged in one row. Similarly, the second conveying path 20b may convey the second fiber bundles 16b disposed in parallel with no space therebetween or may convey the second fiber bundles 16b arranged in one row.

The present invention is not limited to the embodiment described above and various modifications can be made without departing from the concept of the present invention.

What is claimed is:

1. A filament winding apparatus that winds, around a workpiece, a fiber bundle formed by bundling a plurality of fibers, the filament winding apparatus comprising:
    a widening roller configured to rotate while making contact with the fiber bundle that is being conveyed;
    an aligning roller configured to rotate while making contact with the fiber bundle before passing through the widening roller; and
    a collecting roller configured to form the fiber bundle into a band-shaped bundle by rotating while making contact with the fiber bundle that has passed through the widening roller, wherein
    the widening roller includes, provided on a peripheral surface thereof, a plurality of projecting ridges extending in an axial direction of the widening roller, the projecting ridges being arranged side by side in a circumferential direction of the widening roller, and the projecting ridges make contact with the fiber bundle to thereby widen the fiber bundle,
    the aligning roller includes, provided on a peripheral surface thereof, a plurality of circumferential direction grooves extending in the circumferential direction, the circumferential direction grooves being arranged side by side in the axial direction, and a position of the fiber bundle on a conveying path is adjusted in the circumferential direction grooves,
    the fiber bundle includes a plurality of first fiber bundles and a plurality of second fiber bundles,
    the conveying path for the fiber bundle includes a first conveying path configured to convey the plurality of first fiber bundles spaced from each other in parallel, a second conveying path configured to convey the plurality of second fiber bundles spaced from each other in parallel, and a merging path configured to convey the first fiber bundles and the second fiber bundles merged with each other,
    the aligning roller includes a first aligning roller provided in the first conveying path and a second aligning roller provided in the second conveying path,
    the widening roller includes a first widening roller provided in the first conveying path and a second widening roller provided in the second conveying path, and
    the collecting roller includes a first collecting roller and a second collecting roller configured to merge the first conveying path with the second conveying path, and, by passing the first fiber bundles that have passed through the first collecting roller through the second collecting roller together with the second fiber bundles, each of the second fiber bundles is disposed in a space between the first fiber bundles and each of the first fiber bundles is disposed in a space between the second fiber bundles, whereby the band-shaped bundle is formed.

2. The filament winding apparatus according to claim 1, wherein
    the plurality of projecting ridges are arranged at equal intervals in the circumferential direction of the widening roller, and
    each of the intervals between the projecting ridges is smaller than a length in a radial direction of the widening roller from an axis center of the widening roller to a tip of each of the projecting ridges.

3. The filament winding apparatus according to claim 1, wherein
    the peripheral surface of the widening roller is made of fluorine resin or silicone resin, or is coated with fluorine resin or silicone resin.

4. The filament winding apparatus according to claim 1, wherein
    the widening roller comprises a plurality of widening rollers that are arranged in a conveyance direction of the fiber bundle.

5. The filament winding apparatus according to claim 1, wherein
    a surface of the fiber bundle is smoothed by bringing a peripheral surface of the collecting roller into contact with the surface of the fiber bundle.

6. The filament winding apparatus according to claim 1, wherein
    at least the widening roller and the collecting roller among the aligning roller, the widening roller, and the collecting roller each have a heating unit configured to raise a temperature of the peripheral surface thereof.

7. The filament winding apparatus according to claim 1, wherein
    the aligning roller, the widening roller, and the collecting roller are arranged in a staggered manner in a conveyance direction of the fiber bundle, as viewed from the axial direction.

* * * * *